US006985089B2

(12) United States Patent
Liu et al.

(10) Patent No.: US 6,985,089 B2

(45) Date of Patent: Jan. 10, 2006

(54) VEHICLE-TO-VEHICLE COMMUNICATION PROTOCOL

(75) Inventors: Jie Liu, Mountain View, CA (US); Xue Yang, Urbana, IL (US); Feng Zhao, Campbell, CA (US)

(73) Assignee: Palo Alto Reserach Center Inc., Palo Alto, CA (US)

( * ) Notice: Subject to any disclaimer, the term of this patent is extended or adjusted under 35 U.S.C. 154(b) by 164 days.

(21) Appl. No.: 10/693,511

(22) Filed: Oct. 24, 2003

(65) Prior Publication Data

US 2005/0088318 A1 Apr. 28, 2005

(51) Int. Cl.
*B60Q 1/00* (2006.01)

(52) U.S. Cl. ........................................ 340/903; 340/436

(58) Field of Classification Search ................ 340/901, 340/902, 903, 904, 436, 463; 180/167
See application file for complete search history.

(56) References Cited

U.S. PATENT DOCUMENTS

| | | | | |
|---|---|---|---|---|
| 6,249,232 | B1 | 6/2001 | Tamura et al. | 340/902 |
| 6,335,693 | B1 | 1/2002 | Takahashi et al. | 340/905 |
| 6,359,552 | B1 | 3/2002 | King | 340/436 |
| 6,366,913 | B1 | 4/2002 | Fitler, Jr. et al. | 707/9 |
| 6,374,099 | B1 | 4/2002 | Bi et al. | 455/404 |
| 6,405,132 | B1 | 6/2002 | Breed et al. | 701/301 |
| 6,415,333 | B1 | 7/2002 | Vasell | 709/315 |
| 6,417,782 | B1 | 7/2002 | Darnall | 340/902 |
| 6,426,709 | B1 | 7/2002 | Becker et al. | 340/992 |
| 6,429,790 | B1 | 8/2002 | Frese et al. | 340/905 |
| 6,472,978 | B1 | 10/2002 | Takagi et al. | 340/435 |
| 6,765,495 | B1 * | 7/2004 | Dunning et al. | 340/903 |
| 6,861,948 | B2 * | 3/2005 | Lee et al. | 340/436 |
| 2002/0103911 | A1 | 8/2002 | Meifu et al. | 709/227 |

OTHER PUBLICATIONS

Imad Aad, Claude Castelluccia, "Differentiation mechanisms for IEEE 802.11", IEEE INFOROM, Apr. 2001, pp. 1-10.

Chalermek Intanagonwiwant, Ramesh Govindan, Deborah Estrin, "Directed Diffusion: A Scalable and Robust Communication Paradigm for Sensor Networks", in Proceedings of the Sixth Annual Internal Conference on Mobile Computing and Networks (MobiCOM 2000), Boston, Ma, Aug. 2000.

Brad Karp, H.T. Kung, "GPSR: Greedy Perimeter Stateless Routing form Wireless Networks", in Proceedings of the 6th Annual International Conference on Mobile Computing and Networking (MobiCOM 2000), Boston, Ma, 2000, pp. 243-254.

Xue Yang, Nitin H. Vaidya, "Priority Scheduling in Wireless Ad Hoc Networks", ACM International Symposium on Mobile Ad Hoc Networking and Computing (Mobihoc), Lausanne, Switzerland, Jun. 2002, pp. 71-70.

* cited by examiner

*Primary Examiner*—Jeffery Hofsass
*Assistant Examiner*—Jennifer Stone
(74) *Attorney, Agent, or Firm*—Linda M. Robb

(57) ABSTRACT

A method is provided for vehicle to vehicle communication among vehicles having wireless communication links. Upon receiving notification of a sudden change in vehicle behavior, a vehicle broadcasts a priority message to surrounding vehicles within a transmission range. If an emergency event has occurred, a repeat cycle is defined for re-broadcasting the message, and a maximum number of initial repetitions for the message is specified. The message is transmitted repeatedly by a leader vehicle, with a pause between each transmission, until the maximum number of repetitions has been reached.

21 Claims, 14 Drawing Sheets

VEHICLE-TO-VEHICLE COMMUNICATION PROTOCOL

This work was funded in part by the Defense Advanced Research Projects Agency (DARPA), Contract #F30602-00-C-0139. The U.S. Government may have certain rights in this invention.

INCORPORATION BY REFERENCE

The following U.S. patents are fully incorporated herein by reference: U.S. Pat. No. 6,249,232 to Tamura et al. ("Inter-vehicular Communication Method"); U.S. Pat. No. 6,359,552 to King ("Fast Braking Warning System"); and U.S. Pat. No. 6,405,132 to Breed et al. ("Accident Avoidance System").

BACKGROUND

This disclosure relates generally to a vehicle-to-vehicle communication methods, and more particularly to a protocol for achieving enhanced communication reliability on wireless communication links.

Maintaining real-time communications among mobile devices is critical for applications such as vehicle safety (e.g., vehicle collision avoidance), subscription-based mobile user services (e.g., user notification), and distributed coordination (e.g., autonomous air/ground/underwater vehicle formation). To enable widespread deployment of distributed mobile devices such as networked vehicles, one of the major challenges to address is to scale the communication to 10s or 100s of mobile nodes in close proximity while maintaining low message latency. Current approaches broadcast messages from one node to all the other nodes within the communication range without flow control, thus wiping out an entire channel that could be used by other devices.

Emerging technologies and standards such as distributed sensor networks, IEEE Pervasive Computing Magazine special issue, No. 1, January–March 2002, and DSRC (Dedicated Short Range Communication) for vehicle-to-vehicle communication, or the more established technology of 802.11/Bluetooth can enable a wide range of applications such as road safety (e.g., collision avoidance, merge assistance), environmental monitoring (vehicle/people tracking), mobility (mobile information subscription and delivery), device monitoring and service (vehicle/machine health monitoring and diagnostics). For example, the automotive industry alliance on safety (VSCC—Vehicle Safety Communication Consortium), with participation from almost all the major US and foreign auto makers, is basing their next-generation vehicle road safety applications on the DSRC platform.

However, scalability is one of the main issues in deploying the technology for time critical applications such as road safety. As the number of devices (e.g., vehicles) in a neighborhood increases, and the devices are moving (as in vehicles) and spatial proximity relations are constantly changing, managing communication among the mobile devices to guarantee timely delivery of critical messages, such as an imminent collision, becomes the paramount concern. Since bandwidth in technologies such as DSRC or 802.11 is still limited, the desired goal is to minimize unnecessary bandwidth consumption such as blindly repetitive broadcasting to everyone within the listening range, as is often the case with current technology.

A key objective of V2V communication is to reliably provide warnings about hazardous situations to drivers in time for them to react, it is necessary to have a reliable transport protocol specifically designed for V2V communication to satisfy the stringent requirements for reliability and timeliness in safety-critical scenarios.

BRIEF SUMMARY

The disclosed embodiments provide examples of improved solutions to the problems noted in the above Background discussion and the art cited therein. There is shown in these examples an improved message transmission protocol and method, which may provide some or all of the following features.

A method is provided for vehicle to vehicle communication among vehicles having wireless communication links. Upon receiving notification of a sudden change in vehicle behavior, a vehicle broadcasts a priority message to surrounding vehicles within a transmission range. If an emergency event has occurred, a repeat cycle is defined for re-broadcasting the message, and a maximum number of initial repetitions for the message is specified. The message is transmitted repeatedly by a leader vehicle, with a pause between each transmission, until the maximum number of repetitions has been reached.

In another embodiment there is disclosed a system for vehicle to vehicle communication among vehicles having wireless communication links, with each link structured with a controller, which includes a message receiver module and an immediate follower management module. The immediate follower management module receives messages forwarded from the message receiver module and determines the location of a receiving vehicle relative to a sending vehicle. An emergency message generation module generates priority messages when an emergency event occurs. A relevancy decision module receives messages from the message receiver module and determines whether a transmitting vehicle is a potential hazard to the receiving vehicle. Also included is a leader management module, which receives messages from a message receiver module and determines whether a vehicle should continue broadcasting a priority message based on its leadership position. A forwarding monitor module receives messages from a message receiver module and determines whether to forward the message. Broadcasting of messages is handled by an emergency message broadcasting module, while forwarding broadcasted messages is performed by a forwarding broadcasting module. A system clock module periodically triggers the broadcast of regular driving messages by a regular driving message generation module and a regular message broadcasting module.

In yet another embodiment there is disclosed an article of manufacture in the form of a computer usable medium having a computer readable program code that causes a computer to perform method steps for vehicle to vehicle communication among vehicles having wireless communication links. Upon receiving notification of a sudden change in vehicle behavior, a vehicle broadcasts a priority message to surrounding vehicles within a transmission range. If an emergency event has occurred, a repeat cycle is defined for re-broadcasting the message, and a maximum number of initial repetitions for the message is specified. The message is transmitted repeatedly by a leader vehicle, with a pause between each transmission, until the maximum number of repetitions has been reached.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

The transport protocol disclosed herein provides warnings about hazardous situations to drivers in time for them to react through a reliable and timely transmission mechanism for single-hop communications, and definition of a statistical forwarding mechanism for multi-hop communications. It is assumed that a vehicle participating in V2V communication is aware of its geographical location and its own traffic lane as well as the traffic lanes occupied by neighboring vehicles. The vehicles may or may not be equipped with GPS or DGPS receivers to obtain their geographical positions to certain accuracy, or they may be equipped with digital maps to determine lane positions.

For the purposes herein, vehicular ad hoc networks are composed of vehicles equipped with wireless transceivers. The protocol disclosed does not depend on full deployment of wireless transceivers on vehicles. Even a relatively small percentage of communicating vehicles can enhance the safety of all vehicles on the road. Each vehicle in the ad hoc network periodically sends out its own position update with a fixed frequency, for example, one update per second, regardless of the driving situation. Although each vehicle has the location information of other vehicles within its transmission range, this information may not be accurate due to the relatively large updating interval. However, the disclosed transport protocol does not depend on high precision or accuracy of the location information. Additionally, the wireless channel(s) are shared by non-time-sensitive traffic and time-sensitive safety-critical messages, with all message packets sharing a common channel using a contention based multiple access mechanism, such as IEEE802.11a media access control (MAC) protocol.

While broadcasting alert messages to all surrounding vehicles may be the most efficient transmission mode, and repeating the transmission multiple times enhances delivery probability, subsequent problems may arise. For example, too many repeated messages may saturate the communication channel. When multiple signaling vehicles simultaneously exist in a neighborhood, unnecessarily repeated messages also increase the collision probability among the alerting messages, which leads to a degraded packet delivery rate. Issues such as which vehicles should broadcast, at what repeating frequency, and for how long a period of time must be addressed to reduce the collision probability of alert messages.

Figure 1:
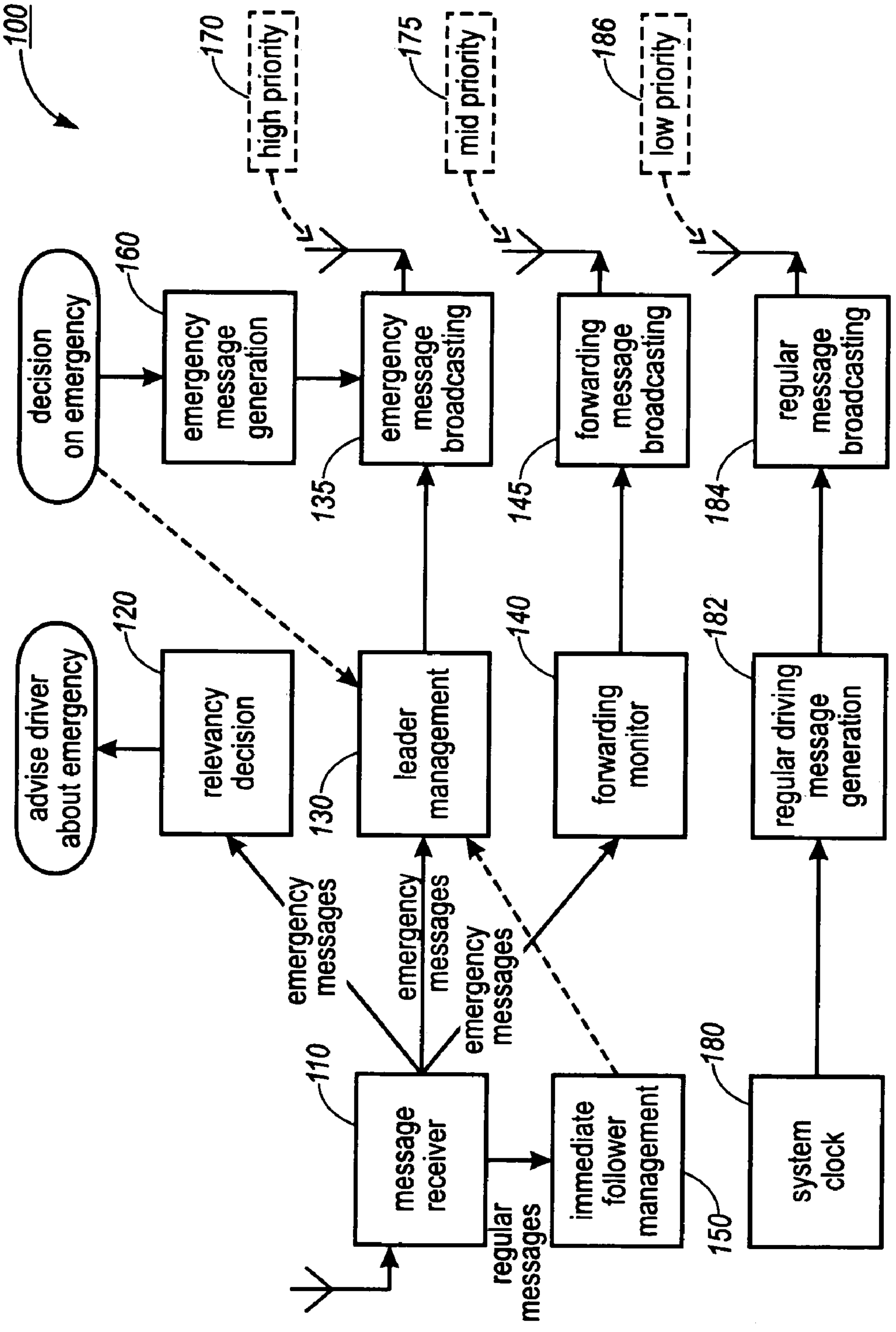
FIG. 1 is a simplified diagram illustrating one embodiment of the vehicle to vehicle communication system diagram disclosed herein.

The disclosed transport protocol can be implemented as a computer-based transport-layer controller built on top of a MAC layer controller. The transport-layer controller may obtain various sensor readings to determine the driving status of the vehicle, may send messages via the MAC layer, and may receive messages sent by other vehicles in the communication neighborhood via the MAC layer. Turning now to FIG. 1, there is shown a simplified diagram of the components in controller 100 for V2V communication in a mobile ad hoc network. A controller utilizes various types of sensor information, such as position, speed, driving direction, acceleration, and vehicle mechanical performance, to determine whether the vehicle movement is deviating from standard driving behavior. The output of the controller is warning messages that may be displayed on the dashboard to advise drivers for potential hazard on the road, for example, stalled vehicles ahead.

Assuming that the radio channel in use by the ad hoc network is shared with other applications in addition to the safety protocol, the channel may easily become saturated with non-time-critical information such as telematics, infotainment, etc. To ensure that emergency alert messages are delivered in a timely fashion despite crowded background communication traffic, a distinction is made between priority and sub-priority messages. Low priority messages 186 include periodic vehicle position updates and other non-time-critical messages such as telematics and infotainment messages. The generation of position update information, performed by regular driving message generation module 182, is triggered by a system clock 180. These messages specify the motion information for the vehicle, for example, vehicle ID, geographical location, speed, driving direction, and acceleration. This information is broadcast to surrounding vehicles by regular message broadcasting module 184. The messages are received by message receiver 110, located in the other vehicles, which forwards the message to immediate follower management module 150 to calculate, for example with the help of a digital map, which lane the sender vehicle is in and its relative position to the receiver vehicle. In particular, immediate follower management module 150 determines whether one of the sender vehicles is the receiving vehicle's immediate follower (IF).

When a vehicle deviates from expected driving behavior, for example by sudden braking, loss of control, etc., controller 100 identifies it as an emergency condition. This information enters the transport-layer controller and triggers emergency message generation module 160 to generate emergency alert messages (EAM). These messages have high priority status 170 and are given channel access preference. Whenever a high priority packet is backlogged, low priority packets contending for the common channel will defer their transmission attempts to ensure that EAMs always access the channel before non-time-critical packets. Priority scheduling is handled by a known MAC layer network protocol, for example, the priority scheduling MAC protocol described in Yang, Xue and Vaidya, Nitin, "Priority Scheduling in Wireless Ad Hoc Networks", *ACM International Symposium on Mobile Ad Hoc Networking and Computing* (*Mobihoc*), June 2002, which uses separate narrow band signaling channels for high priority packets. Another example of priority scheduling MAC protocol, Aad, Imad and Castelluccia, Claude, "Differentiation mechanisms for IEEE 802.11", *IEEE INFOCOM*, April 2001, uses different inter-frame-space for high and low priority packets. Inter-frame-space specifies how long a packet transmitter senses the channel for clear media before sending a packet (IEEE 802.11). The inter-frame-space of low priority packets equals that of high priority packets with the maximum contention window size of high priority packets. Contention window size is the maximum interval of random back-off in IEEE 802.11 protocols. With this approach, a high priority packet is likely to access the channel before a low priority packet does, but there is not an absolute guarantee that this will be the case.

The division of high priority and low priority packets enables EAMs to access the channel faster. While the protocol disclosed herein makes use of MAC service differentiation to defer transmissions of low priority traffic and reduce the collision probability of high priority messages, it does not depend on any particular priority scheduling MAC protocol. By using a priority scheduling MAC protocol, the collisions between low priority packets and high priority packets is greatly reduced, leaving any remaining collisions as collisions among high priority packets.

To further reduce channel contention among high priority alert messages, the distance (D), between a vehicle sending a high priority packet and its immediate follower (IF), is used to determine the MAC layer contention window size for high priority packets. More specifically, when a high priority packet reaches the MAC layer, the MAC uses $f(D)$ as the contention window size, where $f(\ )$ is a monotonic function. For example, if D=10 meters, and $f(\ )$ is an identity function mapping from meters to slots, then $f(D)=10$ slots. Subsequently, the random back-off duration before channel access (which is the time duration that a transmitter waits to sense again after it detects that the media is busy), is chosen from $[0,f(D)]$. Other mappings of $f(\ )$ may also be defined, as long as $f(\ )$ is monotonic. In this way, a sub-priority notion is incorporated into the channel access of high priority packets. The vehicle that has a smaller D can access the channel sooner with a high probability. If a vehicle sending a high priority packet does not have an IF, then D is set to the value of maximum radio transmission range by default.

Upon receiving an EAM, the message receiver module 110 forwards it to relevancy decision module 120, which determines whether the vehicle sending the EAM is a potential hazard to the receiving vehicle. The mechanism of relevancy determination may be accomplished by a motion-cast principle, as described hereinbelow with reference to FIG. 11. If there is potential hazard, then relevancy decision module 120 advises the driver of the potentially dangerous situation. The message receiver module 110 also forwards the EAM to leader management module 130 and forwarding monitor 140.

Leader management module 130 controls whether the vehicle performing a sudden braking or some other non-standard movement should continue to broadcast an EAM, based on its retention of leadership. Leader management is discussed more fully with respect to FIG. 9 hereinbelow. If after initial broadcasting, the vehicle retains leadership, then it repeatedly generates an EAM to be sent by emergency message broadcasting module 135. Further details of the functioning of emergency message broadcasting module 135 are provided in FIG. 2, discussed hereinbelow.

Forwarding monitor 140 makes decisions about whether a message (EAM or EAM-1 to be discussed hereinbelow) heard by message receiver module 110 should be forwarded to other vehicles. If so, the forwarding messages are sent by the forwarding message broadcast module 145. The mid-priority messages yield the channel to high priority messages 170, but in turn have priority over low priority messages 186. Forwarding message broadcasting is discussed more fully with reference to FIGS. 13–15 hereinbelow. Optionally, emergency message broadcasting module 135, forwarding message broadcasting module 145, and regular message broadcasting module 184 may be included in or transmit messages to a single broadcasting module which broadcasts messages based on the message's priority.

Figure 2:
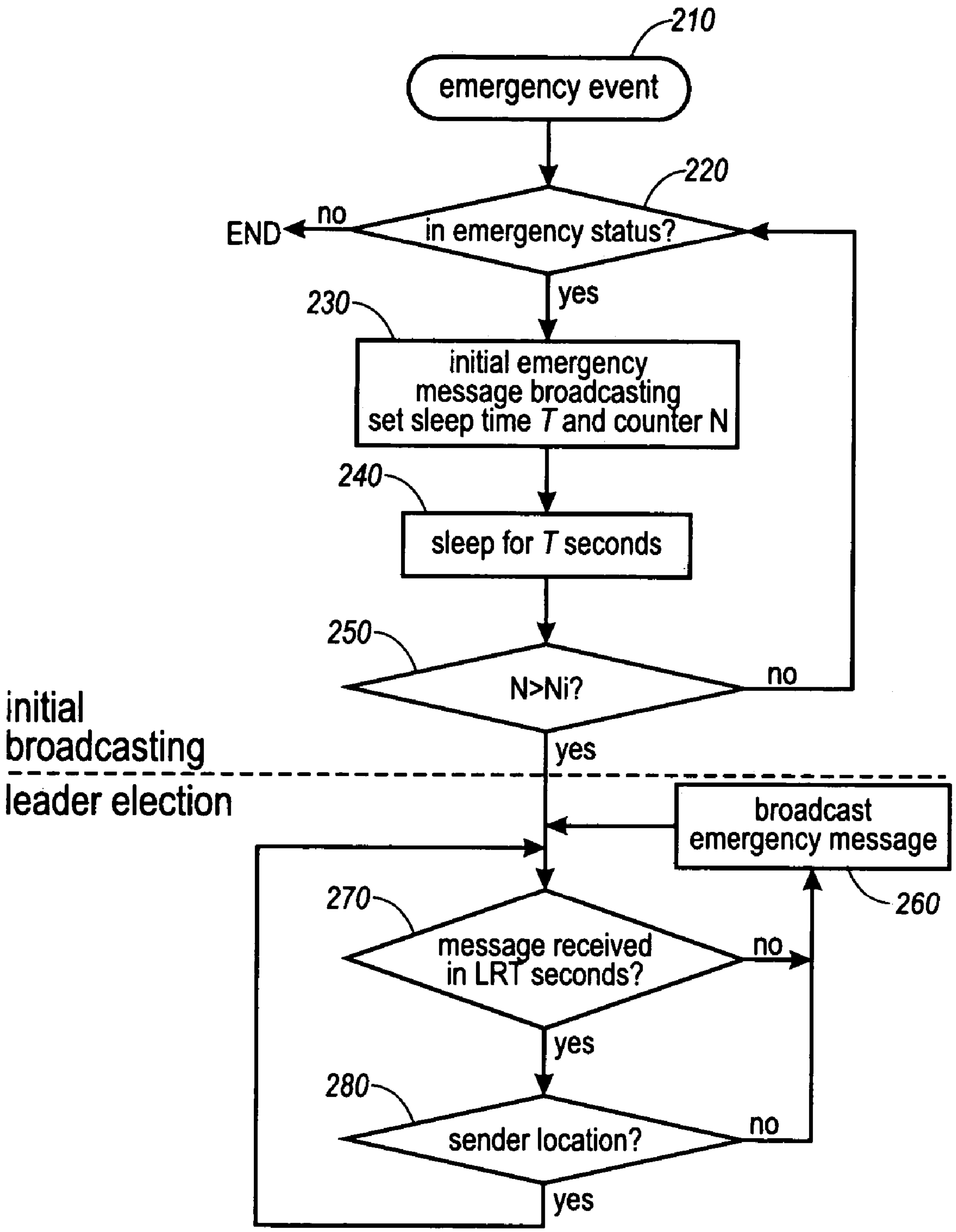
FIG. 2 is a simplified flow diagram of the method for broadcasting of priority messages.

Turning now to FIG. 2, a simplified flow chart illustrates the approach to controlling the repeating frequency of EAMs to preserve their timeliness and avoid saturating the transmission channel. When an emergency event occurs at 210, a decision is made at 220 as to whether the notifying vehicle is in an emergency status. Detecting emergency status can be achieved using a combination of various sensor measurements in the vehicle. Using this information, for example, a vehicle decelerating rapidly will automatically enter an emergency status when its deceleration exceeds a certain threshold. Once entering emergency status, a vehicle automatically initiates EAMs. If it is determined that a vehicle cannot cause any potential hazard to other surrounding vehicles, then the emergency event check ends and an EAM is not generated.

If the vehicle is in an emergency status, for example rapid deceleration, stopping in the middle of a highway, loss of control, etc., an EAM should be sent to surrounding vehicles as soon as possible. However, multiple high priority messages may exist simultaneously, potentially saturating the high priority channel. To avoid this, at 230 the initial EAM is broadcast and a repeat cycle is defined. Note that, with a very small choice of repeating period (T) for the EAM, the EAMs from one emergency vehicle may clog the channel, resulting in long delivery delays of EAMs from other emergency vehicles. On the other hand, with a large T, the average delivery delay of all EAMs may be large. With a large delivery delay of EAMs, a vehicle may travel a considerable distance before receiving the alert message, which increases the safety risk.

To avoid this, an optimum repeating period for the EAM is defined. Since it is likely that most of the surrounding vehicles have received the alert signal after a vehicle has repeated the EAM for multiple times, the message repeating period, T, increases with time, up to a certain limit, so that the frequency of alert messages sent decreases with time, thus conserving channel bandwidth. Increasing T with time also provides channel access and channel utilization priority to the most recently occurring situations. In one embodiment, the repeating period is exponentially increased with respect to time until saturated at a maximum value. Other embodiments may utilize linear or other models to increase the repeating period. After the repeating period has been set and the initial message has been sent, the system pauses at 240 before testing whether the maximum number of repetitions has been reached. If the number of repetitions has not been achieved, it returns to 220 to again test whether the vehicle is still in an emergency status. The loop of 220, 230, and 240 repeats with the repetition counter N increased by one for each loop. When the loop has been repeated for $N_i$ times, the system goes into the leader election stage.

An emergency road situation frequently has a chain effect, for example, when a lead vehicle rapidly decelerates, it is probable that the following vehicles will react by also decelerating suddenly. It is not necessary for all of the vehicles within a series of reacting vehicles to continue sending alert messages, nor is it preferable for them to do so, for several reasons: first, channel bandwidth would be consumed by unnecessary alert messages; and second, multiple senders contending for a common channel are likely to cause an increase in packet collisions, resulting in longer packet delays.

Figure 3:
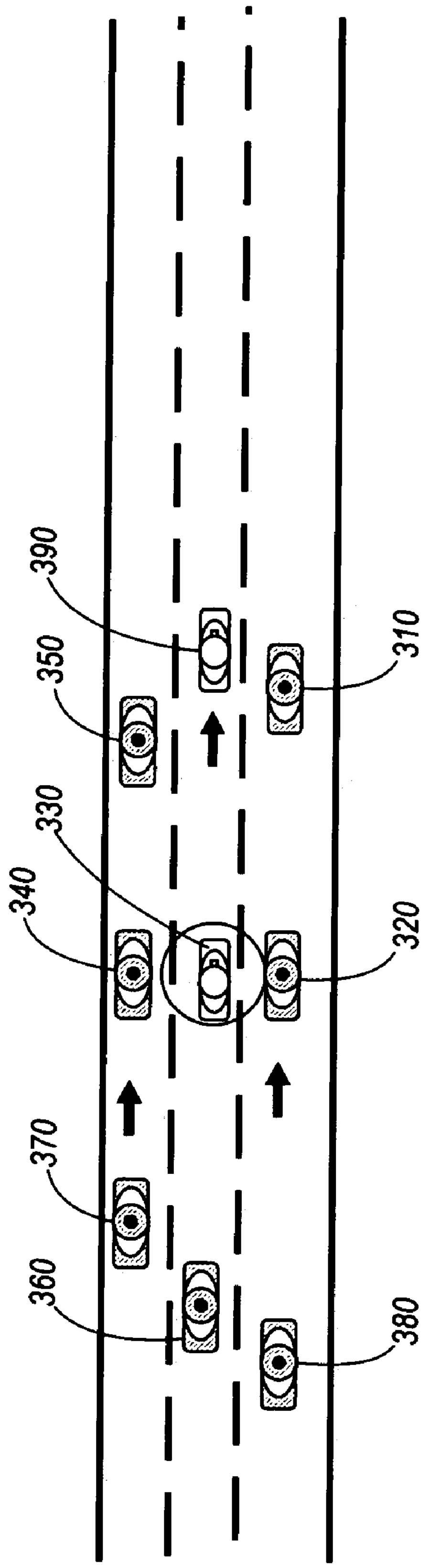
FIG. 3 is a simplified pictorial illustration of a multiple lane highway on which a plurality of closely spaced vehicles are traveling, with multiple vehicles decelerating suddenly.
Figure 4:
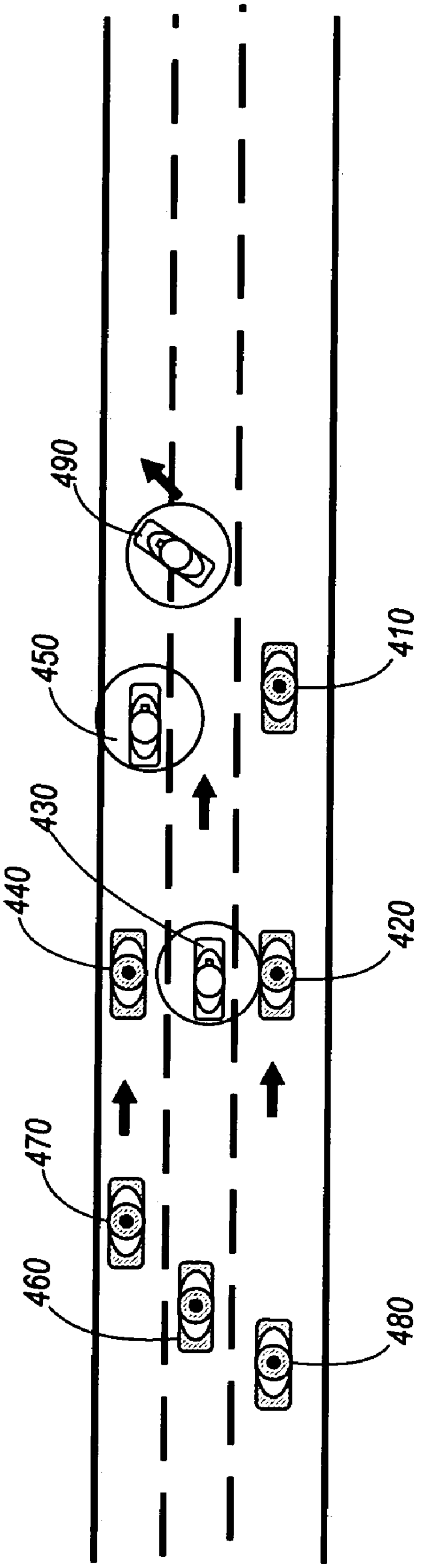
FIG. 4 is a simplified pictorial illustration of a multiple lane highway on which a plurality of closely spaced vehicles are traveling, with a loss-of-control vehicle impacting multiple lanes.

If multiple reacting vehicles occupy the same lane, such as vehicles 330 and 390 in FIG. 3, the surrounding vehicles are probably aware that 330 is in an emergency situation after receiving the EAM from 330. From the viewpoint of vehicle 390, vehicle 330 shields it from all vehicles following 330 in that lane, in this case vehicle 360. Therefore, vehicle 390 does not need to repeat its EAM so long as 330 is sending alert messages. In another example shown in FIG. 4, if vehicle 490 is out of control and its trajectory crosses multiple lanes, then both 430 and 450 must generate alert messages to warn vehicles in both lanes. Furthermore, since vehicle 490 is not adhering to a single lane, it needs to transmit alert messages as well, to alert vehicles in impacted lanes. As illustrated by these examples, for the purposes herein, emergency events are associated with a specific lane(s), not with a specific vehicle(s).

Returning now to FIG. 2, from the perspective of reducing alert message delivery delay and improving channel bandwidth utilization, one leader per transmission range is elected for each event. While sending initial broadcasting messages, the system also listens to the packets sent by other vehicles. After $N_i$ repetitions of the initial broadcasting has finished at 270, a vehicle counts the number of EAMs received in the last Leader Regain Time (LRT) seconds and identifies the sender of these messages. If, at 280, the received EAM indicates that the sending vehicle is behind the receiving vehicle and in the same lane, then the system returns to 270 and checks again. If either no EAM is received in LRT seconds or none of the EAMs received are from vehicles following in the same lane, then the vehicle broadcasts the emergency message at 260. The vehicles that broadcast EAMs are effectively leaders that are responsible for warning neighboring vehicles within the transmission range of the emergency status.

Returning now to FIG. 3, leadership transfer is illustrated in more detail. As discussed hereinabove, when a vehicle experiences an emergency condition, it becomes an initial leader. This leadership is transferred if two conditions are satisfied:

1. An initial leader must repeat the alert messages for the lower-bounded time duration $T_{min\_alert}$, calculated from T and $N_i$. As explained before, in highly mobile vehicle ad hoc networks, it is not possible to rely on any form of acknowledgement to ensure that all surrounding vehicles are receiving an alert signal. Instead, alert messages are actively repeated throughout the $T_{min\_alert}$ time period beginning with the occurrence of a hazardous event.

2. Implicit acknowledgement is utilized to ensure that an IF receives the alert signal. More specifically, an endangering vehicle will not release its initial leadership until it overhears that its IF has become a leader.

In the example shown in FIG. 3, vehicle 390 decelerates suddenly, followed by 330. After 390 repeats the alert messages for $T_{min\_alert}$ time duration, if vehicle 390 overhears alert messages from vehicle 330, vehicle 390 will relinquish its leadership, becoming a non-leader even though it remains in an emergency state.

Figure 5:
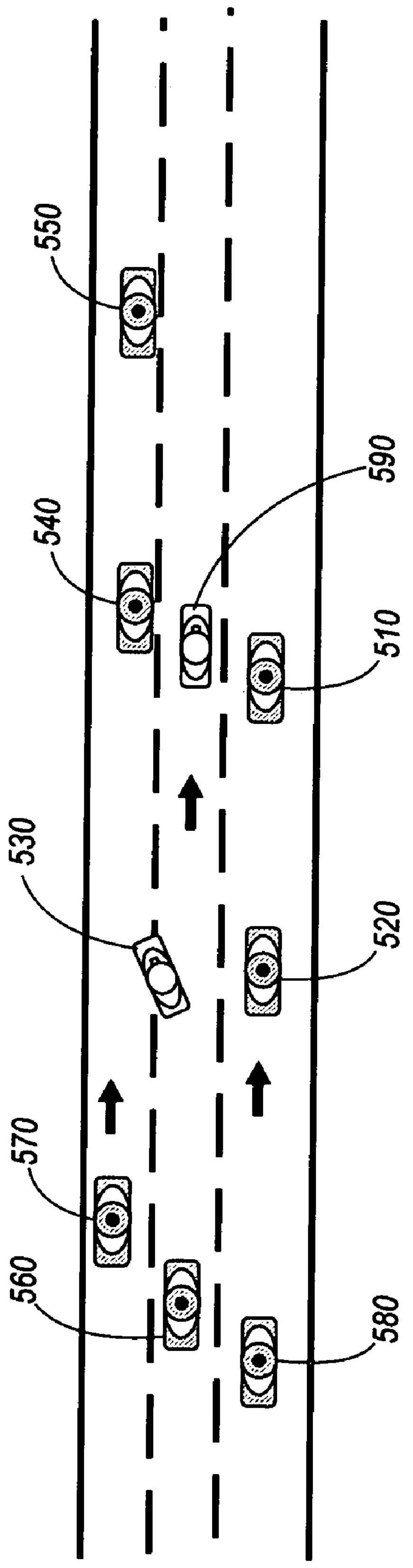
FIG. 5 is a simplified pictorial illustration of a multiple lane highway on which a plurality of closely spaced vehicles are traveling, with a vehicle leadership change.

In another example as shown in FIG. 5, vehicle 590 decelerates suddenly. On receiving the EAM from vehicle 590, vehicle 530 elects to change lanes. As vehicle 530 does not decelerate suddenly and remains in normal driving status, it does not go into an abnormal state and does not become a leader. As a result, vehicle 590 retains its leader position and repeats the alert messages to warn any approaching vehicle.

This procedure is robust to vehicle mobility and does not require high precision or accuracy for neighbor vehicle locations. In FIG. 5, vehicle 590 regards vehicle 530 as its follower and continues repeating alert messages while vehicle 530 changes lanes. At a later time, vehicle 560 will become the IF of vehicle 590. Through the periodic location update, vehicle 590 will finally realize that vehicle 560 is its new IF. If vehicle 560 decelerates suddenly, vehicle 590 will hand off its leadership. Through this procedure, the final vehicle remaining in a deceleration string will be the leader that warns any approaching vehicles.

Figure 6:
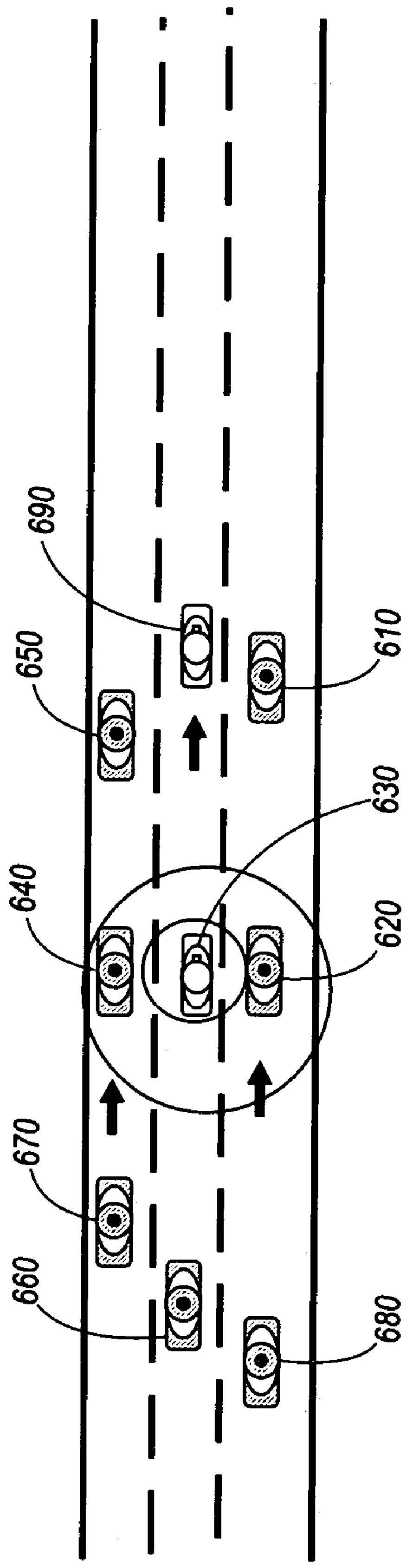
FIG. 6 is a simplified pictorial illustration of a multiple lane highway on which a plurality of closely spaced vehicles are traveling, with a leadership change.
Figure 7:
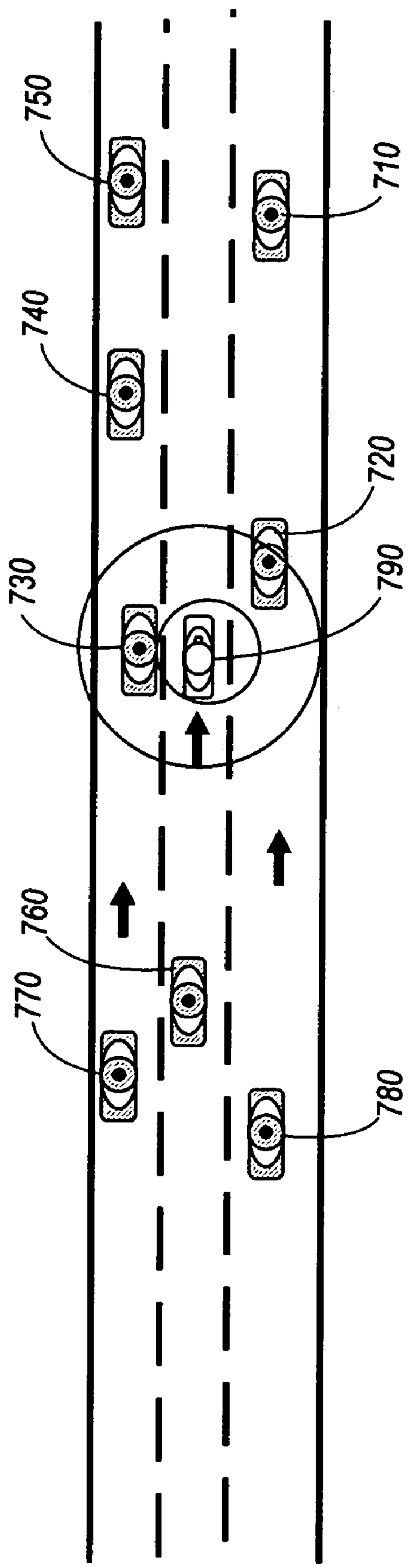
FIG. 7 is a simplified pictorial illustration of a multiple lane highway on which a plurality of closely spaced vehicles are traveling, with a vehicle leadership re-election.
Figure 8:
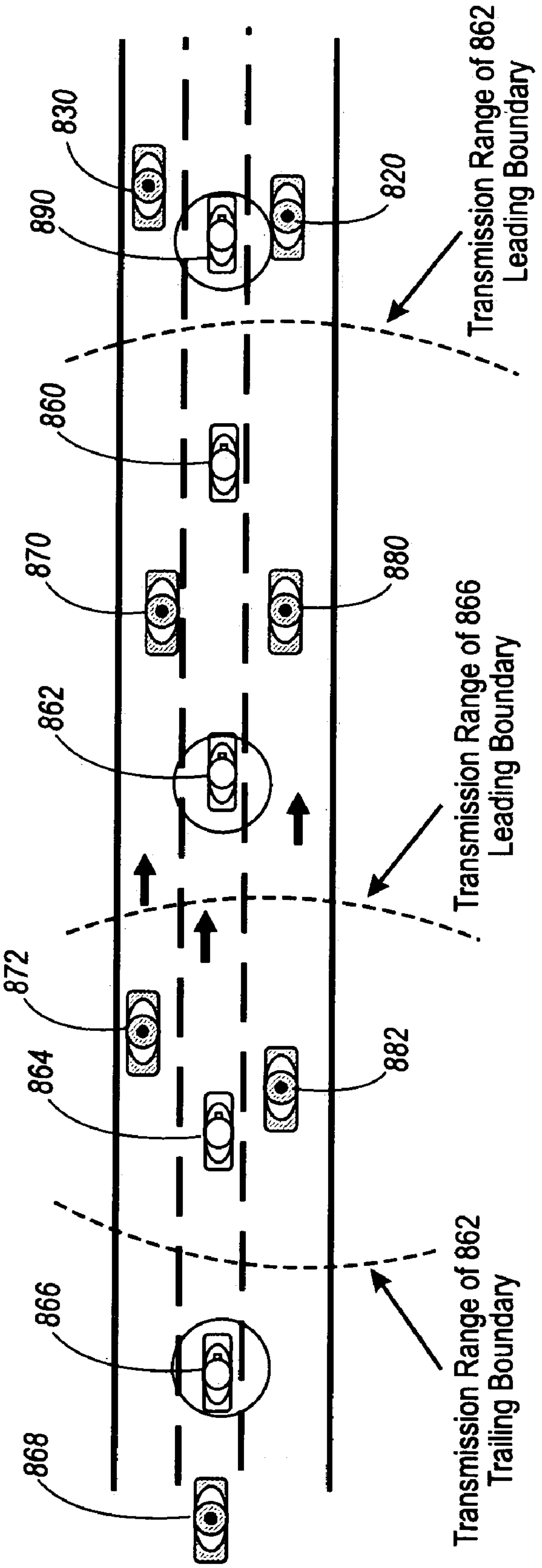
FIG. 8 is a simplified pictorial illustration of a multiple lane highway on which a plurality of closely spaced vehicles are traveling, showing leadership per transmission range.

Leader re-election is illustrated in FIGS. 6–8. As long as an endangering condition remains in a single lane, EAMs are periodically sent to warn any other vehicle that could approach the dangerous region. For example, in FIG. 6, both vehicle 690 and vehicle 630 have come to a stop in a single lane, presenting a hazard to approaching vehicles. In this example, vehicle 630 functions as a leader (with vehicle 690 as a non-leader) and repeats the EAM. By receiving alert messages from vehicle 630, approaching vehicles 660, 670, and 680 have sufficient warning to enable their drivers to respond appropriately.

In FIG. 7, vehicle 730 has changed lanes and is passing vehicle 790. As vehicle 790 remains immobile, it must assume leadership and begin issuing emergency alert messages. To achieve leader re-election, if an endangering vehicle does not receive any alert messages from vehicles behind it during a LRT duration, it will re-elect itself as the leader and repeat the EAM. Whenever two vehicles compete for leadership, the one that is further behind is given primacy.

As shown in FIG. 8, the area around each leader vehicle is covered by alert messages and only one leader is permitted per transmission range. For example, leader vehicle 866 broadcasts EAMs within its transmission range, which is partially shown in FIG. 8. Vehicle 862, located outside the transmission range of vehicle 862, holds the leader position and broadcasts EAMs within a transmission range shown by the dashed curved lines to the far right and far left in the figure. Similarly, being outside the transmission range of vehicle 862, vehicle 890 also holds a leader position and broadcasts EAMs. Within each transmission range, surrounding vehicles may receive the EAMs from the leader vehicle within that transmission range to advise drivers of a potential hazard.

The value of LRT may be derived from the transmission range and the maximum speed of the vehicles. In FIG. 8, suppose vehicle 866 changes lanes to avoid vehicle 864, and another vehicle 868 is approaching vehicle 864 from behind. After vehicle 868 enters the transmission range of vehicle 864, the longest possible duration during which no alert messages are transmitted to vehicle 868 is 2*LRT. If the radio transmission range is 300 meters and the velocity of vehicle 868 is 80 miles/h (35 meters/sec), then the distance needed for vehicle 868 to completely stop is 249 meters, assuming a deceleration rate of 3 meter/s$^2$. With LRT=0.5 s, each vehicle will have at least 400 ms to receive alert messages before the distance between vehicle 868 and vehicle 864 is less than 249 meters. With large probability, vehicle 868 will receive the EAM in sufficient time to react to the hazard.

Figure 9:
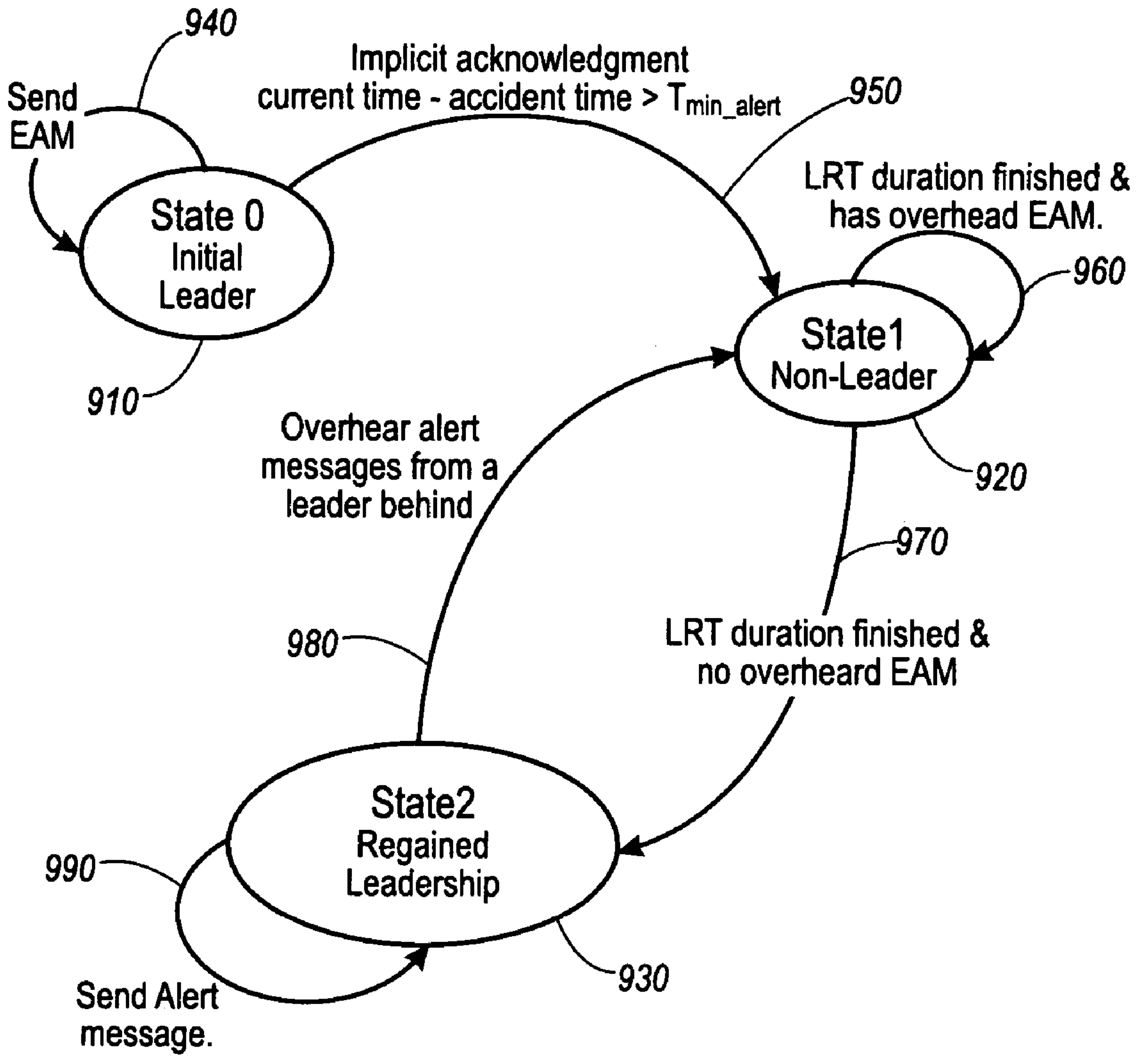
FIG. 9 is a simplified diagram of a leader election/re-election state machine corresponding to an emergency action message.

The leader election/re-election procedure is further illustrated by the diagram of FIG. 9. At 910 an initial leader vehicle sends an emergency action message 940. At 950, if there is an implicit acknowledgement from the immediate follower and if the current time less the time at which the EAM was initiated, is larger than $T_{min\_alert}$ (defined hereinabove), then the vehicle relinquishes initial leadership and enters a non-leader state 920. Otherwise, it remains in the initial leader state and broadcasts EAMs. Overheard messages are used as implicit acknowledgement that the IF has received alert messages from the leader reliably and timely. The non-leader status is retained if the leader regain time duration is met and the non-leader has overheard an EAM from another vehicle behind and in the same lane. If, at 970, the leader regain time duration is met and there is no overheard EAM from another vehicle behind and in the same lane, then leadership is regained at 930. As long as leadership is retained, the vehicle sends alert messages 990. At 980, regained leadership is forfeited if alert messages are received from another leader vehicle located behind the regained leader.

Figure 10:
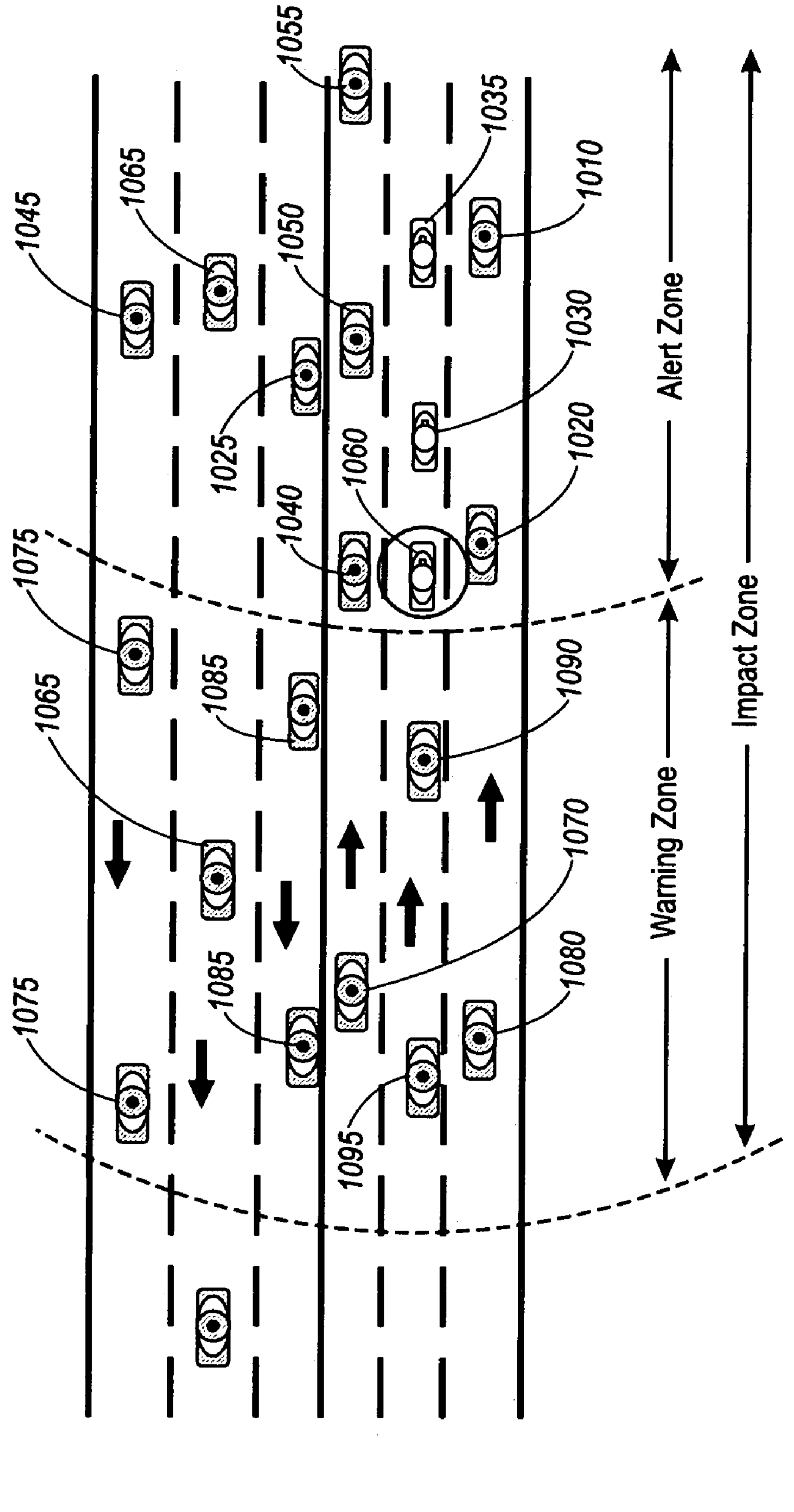
FIG. 10 is a simplified pictorial illustration of a multiple lane highway on which a plurality of closely spaced vehicles are traveling, with priority messages being forwarded.

Turning now to FIG. 10, a simplified diagram illustrates the use of message forwarding to provide warnings to vehicles beyond the transmission range of the endangering vehicle. However, it is necessary to limit the forwarding range, since forwarding emergency alert messages indiscriminately would have no significant benefit in terms of ensuring driving safety and could disturb the normal traffic flow. With a one-hop transmission range of 300 meters (as defined by DSRC for safety-critical messages), it may be assumed that only the vehicles within one-hop transmission range of the endangering vehicle will react by abruptly decelerating. Therefore, alert messages are forwarded to at most two hops from the signaling vehicle.

In the example shown in FIG. 10, vehicle 1090 and vehicle 1095 are outside the transmission range of EAMs from endangering vehicle 1035. Both vehicle 1060 and vehicle 1030 may abruptly decelerate after receiving alert messages from vehicle 1035. However, deceleration by vehicle 1060 may create a potential hazard for vehicle 1090 and its following vehicles in the center lane. If vehicle 1090 and vehicle 1095 receive warnings in advance, they may either decelerate or change lanes to avoid a collision. Warning vehicle 1090 and vehicle 1095 in advance may be achieved by forwarding an EAM from vehicle 1035. For example, once vehicle 1060 receives an EAM, it may retransmit the message so that vehicle 1090 and vehicle 1095 do not have to depend on perceiving the brake lights of vehicle 1060 to become aware that a hazardous condition may exist. Instead, vehicle 1090 and vehicle 1095 can be made aware of the hazardous situation ahead almost simultaneously with vehicle 1060. Additionally, some vehicles within the transmission range of vehicle 1035 may not be able to receive alert messages from vehicle 1035 because of communication obstacles. Instead, they may be reached via the forwarded messages, thereby overcoming communication blind spots.

Not all vehicles receiving an EAM need to respond to or forward the messages. For example, vehicle 1055 in FIG. 10 is ahead of endangering vehicle 1035, so it does not need to respond to the alert messages from vehicle 1035, neither does it need to forward it. To more clearly identify the vehicles which properly forward the messages, an impact zone and two sub-regions within it are defined: the alert zone and the warning zone. The impact zone only includes the region in which alert messages may be sent to reach those vehicles that may be potentially impacted. The impact zone may be defined according to location, speed, acceleration/deceleration, or moving direction of the endangering vehicle. According to a certain predefined rule, each vehicle that receives an alert message may determine whether it belongs to the impact zone based on its own location and moving direction. For example, if the impact zone is defined as the region behind the endangering vehicle, then in FIG. 10, vehicles 1020, 1030, 1060, 1050, 1070, 1095, 1080, and 1040 belong to the impact zone of vehicle 1035.

One approach to defining an impact zone exploits physical information such as motion parameters to define, for each node, a region of cooperative communication (or motion-cast region) around it, with the goal of significantly reducing unnecessary messages and improving reliability and real-time responsiveness of the network. The motion-cast region is shaped by motion and other physical attributes of the nodes in the group, and is dynamically updated as the physical parameters of the situation change.

Figure 11:
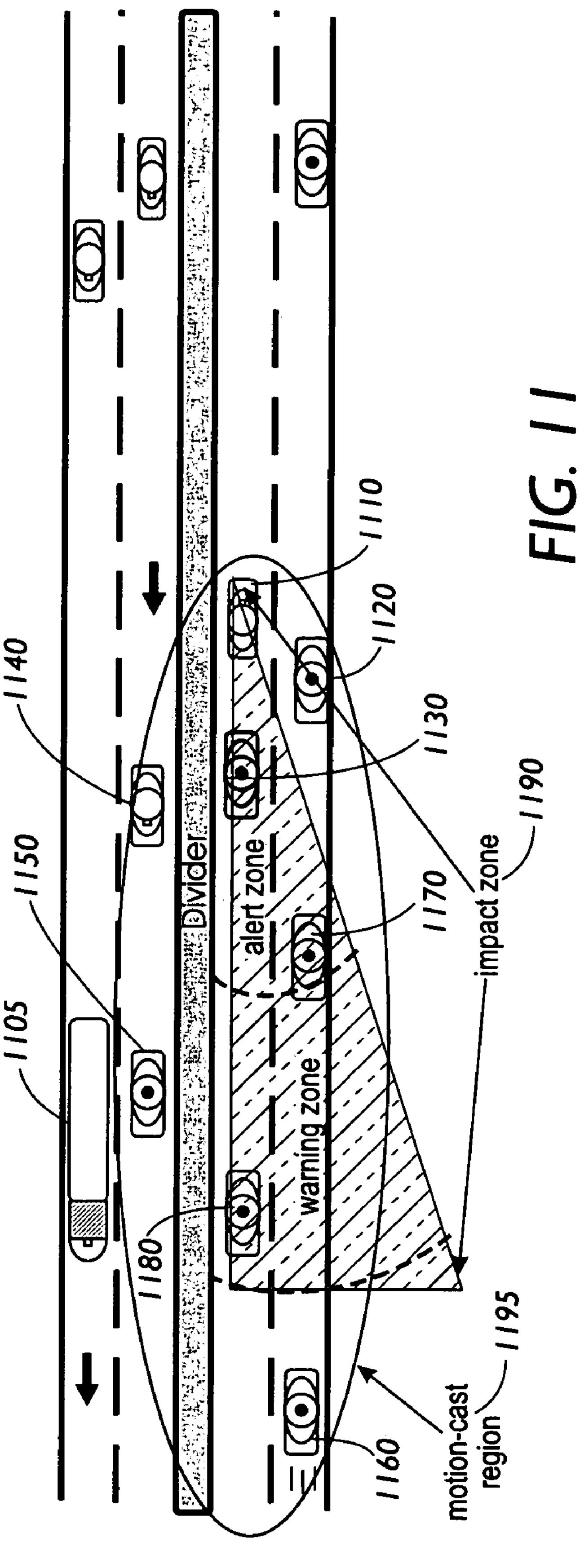
FIG. 11 is a simplified pictorial illustration of a multiple lane highway on which a plurality of closely spaced vehicles are traveling, with a regions of relevance depicted.

Turning now to FIG. 11, vehicle 1110 broadcasts an emergency alert message. For the vehicles that receive the message, such as vehicles 1120, 1130, 1140, 1150, 1160, 1170, and 1180, motion-cast defines the impact zone 1190 (the shaded triangular region) and updates it dynamically as vehicles leave or enter the region. The receiving vehicle determines whether it is in impact zone 1190 using the motion-cast principle described hereinbelow. Multiple regions (or groups) may simultaneously co-exist. FIG. 11 shows the relationship between the motion-cast region, which includes all vehicles which collaboratively establish the impact zone, the impact zone itself, the alert zone, and the warning zone. Thus, the motion cast region may include vehicles on the other side of the road, for example vehicles 1150 and 1140. The impact zone includes vehicles that may be impacted by the emergency braking event of vehicle 1110. The impact zone is divided into two sub-regions, an alert zone, which is within one communications radius from vehicle 1110, and a warning zone, which is outside the alert zone but within two communications radii from vehicle 1110.

Assume, for example, that vehicle 1110 initiates an emergency braking to avoid hitting a crossing deer. This braking event needs to be broadcast to other vehicles, especially those immediately behind it, such as 1130, or those in the immediate next lane, traveling in the same direction, such as 1170. Vehicles that are further behind, such as 1180, will have more time to react to the event, and could be notified through 1130. Vehicles in front of 1110 and those on the other side of the center divider (vehicles 1140 and 1150) will not be immediately relevant to 1110's braking event but may be involved in forwarding messages to establish the impact zone reliably. The shaded triangular region behind vehicle 1110 is 1110's impact zone immediately following its braking event. The region is defined by the physical motion attributes such as velocity directions and magnitudes of the other vehicles relative to 1110.

Figure 12:
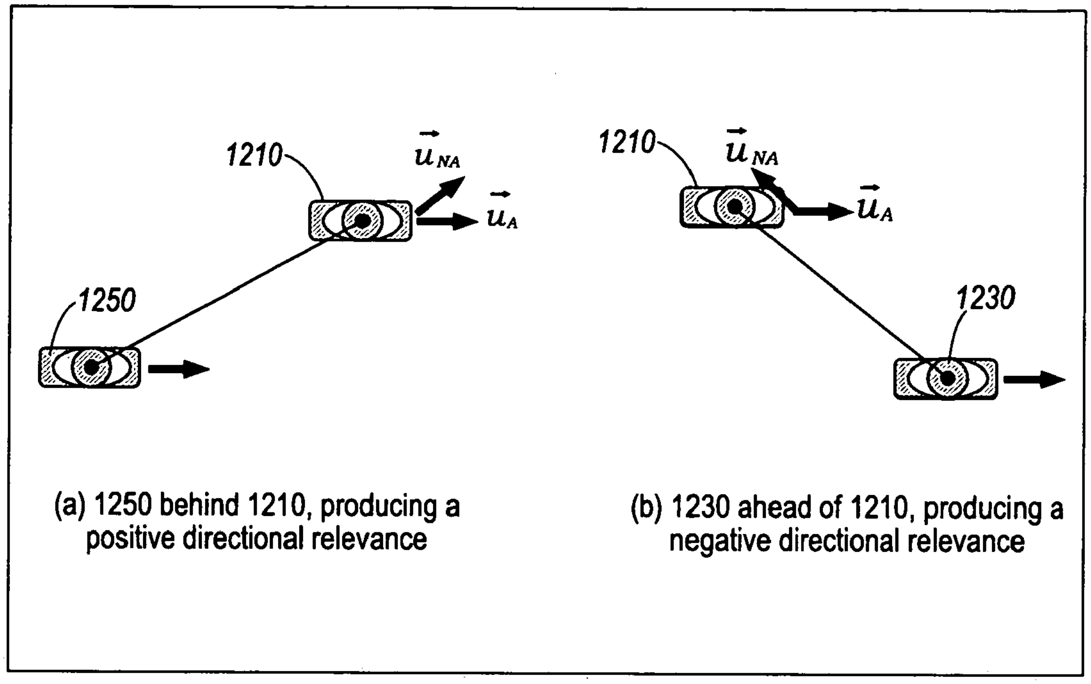
FIG. 12 is a simplified diagram illustrating positive and negative directional relevance.

Turning to FIG. 12, one approach to determining the alert zone for the braking event is to define those vehicles that are within the communication radius of the braking vehicle, traveling in the same direction, and immediately behind or next to the braking vehicle 1210 (A) as being relevant to the braking event. More formally, define $$\vec{u}_A = \frac{\vec{v}_A}{|\vec{v}_A|}$$

as the unit vector in the direction of the A's travel, and $$\vec{u}_{NA} = \frac{(\vec{x}_A - \vec{x}_N)}{|\vec{x}_A - \vec{x}_N|}$$

as the unit vector from another vehicle N to A, in which braking vehicle 1210 (A) is ahead of 1250 (N), producing a positive directional relevance. Braking vehicle 1210 is behind 1230, resulting in a negative directional relevance. The symbols v and x denote velocity and position, respectively. To decide whether vehicle 1250 is in the impact zone of 1210 or not, the directional relevance of vehicle 1250 (the higher the more relevant) is given by the dot product $$R_{dir} = \vec{u}_A \cdot \vec{u}_{NA} = \frac{\vec{v}_A}{|\vec{v}_A|} \cdot \frac{(\vec{x}_A - \vec{x}_N)}{|\vec{x}_A - \vec{x}_N|},$$

while the distance relevance is given by $$R_{dist} = \frac{1}{|\vec{x}_A - \vec{x}_N|}.$$

The total relevance factor for a vehicle to participate in A's impact zone is thus $$R = R_{dir} \cdot R_{dist}.$$

Now the criterion for 1250 to be in vehicle 1210's impact zone is defined as:

$$|\vec{x}_A - \vec{x}_N| \leqq R_{comm\_dist} \text{ and } R = R_{dir} \cdot R_{dist} \geqq \alpha_{relevence}.$$

One possible example approach to implementing this impact zone definition scheme in a distributed mobile device network is for the leader node, such as vehicle 1210 in the example, to send its motion parameter vector $\vec{m}$=[id, $\vec{x}$, $\vec{v}$, $ch_{broadcast}$ . . . ] in EAMs to a vehicles within its communication radius $R_{comm\_dist}$. Everyone who receives the packet applies the membership test $$|\vec{x}_A - \vec{x}_N| \leqq R_{comm\_dist} \text{ and } R = R_{dir} \cdot R_{dist} \geqq \alpha_{relevence}.$$

to determine if it is in the impact zone of the node specified in the packet. Those that pass the test will advise the driver of a potentially dangerous situation. Thus, the nodes in the zones can be changed as they move relative to the leader node.

The impact zone within one communication hop of the endangering vehicle is the alert zone, since vehicles within it bear the most danger. Other vehicles that may bear potential danger within the impact zone form the warning zone. Since the warning zone extends behind the alert zone, only those vehicles within the alert zone will need to react by sudden braking. It is sufficient to forward alert messages only one transmission range further. That is, when an alert message reaches a vehicle at the outermost transmission range of the braking vehicle, a corresponding forwarded pre-warning message reaches the further end of the warning zone. The warning zone is defined as a region that is within the impact zone but is out of the alert zone. It is the intersection of the impact zone and twice the transmission range from the braking vehicle, but outside of one transmission range from the braking vehicle.

Figure 13:
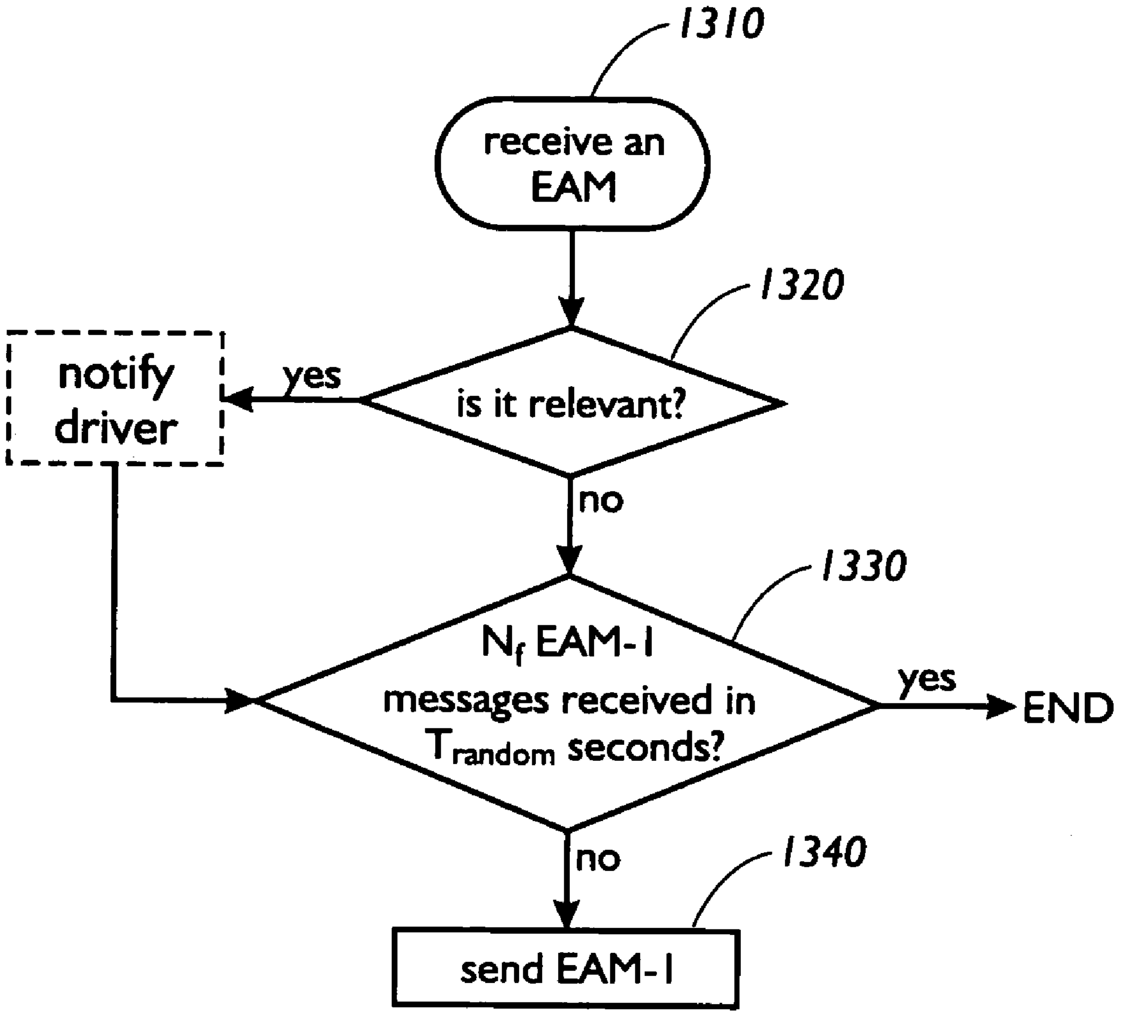
FIG. 13 is a simplified flow diagram of the method for handling priority messages.

Turning now to FIG. 13, there is illustrated a random forwarding method in the motion cast region to establish a warning zone. On receiving an EAM at 1310, a determination is made as to its relevance at 1320. The relevance decision may be based on its impact zone membership, as described hereinabove. If the EAM is relevant, the driver is notified; if the EAM is not relevant, each vehicle within the motion-cast region that receives the EAM waits for a random duration (chosen from [0, $T_{foward}$]) at 1330. Defining the forwarded message of EAM as EAM-1, EAM-1 is simply a duplicated version of EAM with a different label, say "EAM-1" rather than "EAM". Another design parameter, $N_f$, determines how many vehicles within one transmission range should send EAM-1. When a vehicle receives an EAM and the number of EAM-1 messages it has overheard before the random waiting time expires is less than $N_f$, then the vehicle transmits an EAM-1 at 1340.

Figure 14:
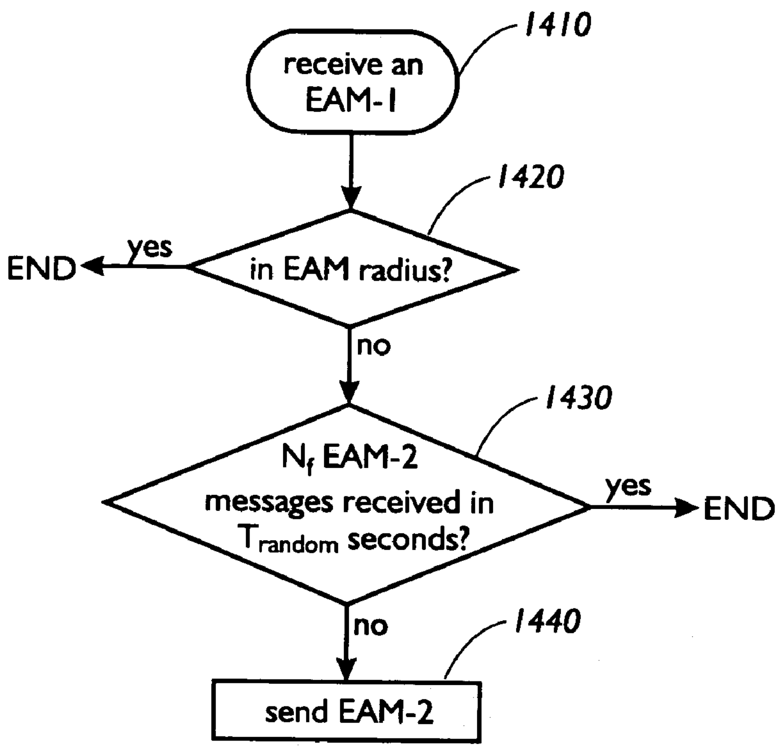
FIG. 14 is a simplified flow diagram of the method for handling forwarded first-hop priority messages.

Turning now to FIG. 14, each vehicle within the motion-cast region receiving an EAM-1 at 1410 calculates its distance to the endangering condition, for example a braking vehicle (the location of the endangering condition is included in the EAM-1) at 1420. If the vehicle is outside of the transmission range of the braking vehicle, then this vehicle waits for a random duration (again, chosen from [0, $T_{forward}$]) before forwarding the EAM-1 (the forwarded version of EAM-1 is named EAM-2) at 1440. During the random waiting period, if the number of EAM-2 messages a vehicle overhears exceeds $N_f$, then the vehicle drops out of the forwarding procedure. Otherwise, it will transmit an EAM-2 when the random waiting time expires.

Figure 15:
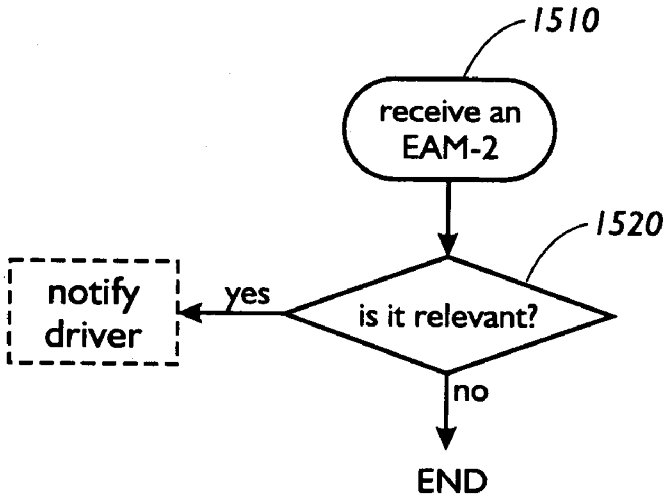
FIG. 15 is a simplified flow diagram of the method for handling forwarded second-hop priority messages.

Handling of EAM-2 messages is illustrated in FIG. 15. On receiving an EAM-2 at 1510, a determination is made as to its relevance at 1520. The relevance decision may be based on its impact zone membership, as described hereinabove. If the EAM-2 is relevant, the driver is notified; if the EAM-2 is not relevant, the message is not further forwarded. Through this two-hop forwarding procedure, pre-warning signals are insured of reaching vehicles in the warning zone.

To avoid packet collisions, forwarded messages are defined as mid-priority packets in relations to high priority EAMs and low priority regular messages, as shown in FIG. 1 at 175. One example approach to achieving this is utilization of a different contention window size for random back-off in the MAC layer protocol. For example, the random back-off durations for forwarded messages are chosen from [0, $CW_1$], with the random back-off duration for background traffic chosen from [$CW_1$, $CW_2$], where $CW_1$ and $CW_2$ are contention window sizes as defined in IEEE802.11 standards and $CW_2$>$CW_1$. By doing so, the mid-priority forwarding message have a higher probability of occupying the channel than the low priority packets.

While the present discussion has been illustrated and described with reference to specific embodiments, further modification and improvements will occur to those skilled in the art. For example, in gamed or real battle fields, players (soldiers) need to collaboratively collect battle field information, with the information collected by each individual having different priorities based on its content. The transport-layer protocol here can achieve reliable dissemination of information in a mobile ad hoc network using minimum bandwidth. For another example, networked handheld devices enable context-aware computation and information retrieval. The protocol disclosed here can achieve geographical coverage of real-time information (e.g. news, traffic, disaster, etc.) using a minimum number of devices. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for vehicle to vehicle communication among a plurality of vehicles having wireless communication links, comprising:

receiving notification of a priority message communication from a notifying vehicle, wherein said priority message communication concerns a sudden change in vehicle behavior;

broadcasting not less than one priority message communication to surrounding vehicles within a transmission range if said notifying vehicle is experiencing said sudden change in vehicle behavior;

determining whether said sudden change in vehicle behavior comprises an emergency event, wherein said emergency event includes creating a potential hazard to other vehicles;

discontinuing broadcasting of said priority message to said surrounding vehicles if said sudden change in vehicle behavior does not comprise an emergency event;

defining a repeat cycle, wherein said repeat cycle comprises the frequency with which said priority message is re-broadcast;

defining a maximum number of initial repetitions for said priority message;

pausing for variable time intervals between each transmission of said priority message;

determining whether said maximum number of repetitions has been reached;

repeating broadcasting said priority message and pausing between each said transmission until said maximum number of repetitions has been reached; and electing a leader vehicle, wherein said leader vehicle is the primary transmitting vehicle in a series of vehicles reacting to said emergency event.

2. The method for vehicle to vehicle communication according to claim 1, wherein determining whether said notifying vehicle is in an emergency status comprises detecting sensor measurements from said notifying vehicle.

3. The method for vehicle to vehicle communication according to claim 1, wherein said repeat cycle comprises an optimum repeating period for said priority message.

4. The method for vehicle to vehicle communication according to claim 3, wherein said optimum repeating period includes increasing said repeating period with time up to a predetermined limit.

5. The method for vehicle to vehicle communication according to claim 1, wherein electing a leader vehicle comprises:

determining whether said priority message has been received within leader regain time, wherein said leader regain time is derived from the transmission range and the maximum speed of the vehicles;

identifying the sender of said priority message;

determining the location of said sender;

broadcasting said priority message if said sender is not located behind a receiver or if said priority message has not been received within leader regain time; and repeating determining whether said priority message has been received within leader regain time if said sender is located behind said receiver.

6. The method for vehicle to vehicle communication according to claim 1, further comprising transfer of vehicle leadership.

7. The method for vehicle to vehicle communication according to claim 6, wherein leadership transfer comprises:

receiving notice that a following vehicle has become a leader vehicle, wherein said following vehicle comprises a new leader vehicle for an emergency event within the transmission range for said event; and transferring leadership if the time at which said priority message is received less the time at which said priority message was initiated is larger than a minimum time for which said priority message may be repeated, wherein said minimum time comprises the amount of time required for said maximum number of initial repetitions of said priority message to be reached.

8. The method for vehicle to vehicle communication according to claim 1, further comprising regaining leadership.

9. The method for vehicle to vehicle communication according to claim 8, wherein regaining leadership comprises:

receiving no said priority message within a calculated leader regain time; and transmitting said priority message.

10. The method for vehicle to vehicle communication according to claim 1, further comprising identifying priority message forwarding vehicles.

11. The method for vehicle to vehicle communication according to claim 10, wherein identifying said message forwarding vehicles comprises defining an impact zone, wherein said impact zone includes those vehicles that may be impacted by said emergency event.

12. The method for vehicle to vehicle communication according to claim 11, wherein said impact zone is defined according to not less than one of location, speed, acceleration/deceleration, or moving direction of the vehicle experiencing said emergency event.

13. The method for vehicle to vehicle communication according to claim 11, wherein said impact zone includes an alert zone and a warning zone, wherein said alert zone includes vehicles within one communications radius from said leader vehicle, and wherein said warning zone includes vehicles outside of said alert zone but within two communications radii from said leader vehicle.

14. The method for vehicle to vehicle communication according to claim 13, wherein said impact zone is included within a motion-cast region.

15. The method for vehicle to vehicle communication according to claim 13, wherein forwarding said priority message within said alert zone comprises:

receiving said priority message;

determining the relevance of said priority message, wherein relevance is based on membership in said impact zone;

providing notification if said priority message is relevant;

pausing for a random duration and listening for other forwarded priority messages if said priority message is not relevant; and forwarding said priority message if the number of said forwarded priority messages received within said random duration is less than a specified number.

16. The method for vehicle to vehicle communication according to claim 13, wherein forwarding said priority message outside of said alert zone comprises:

receiving a forwarded priority message by a receiving vehicle;

determining whether said receiving vehicle is within a motion-cast region for said leader vehicle, wherein said motion-cast region includes vehicles within said impact zone;

pausing for a selected time duration and listening for other forwarded priority messages if said receiving vehicle is outside of said alert zone for said leader vehicle;

forwarding said forwarded priority message if the number of said forwarded priority messages received within said selected time duration is less than a specified number; and dropping out of the forwarding procedure if said receiving vehicle is within said motion-cast region for said leader vehicle or if said number of said forwarded priority messages received within said selected time duration is greater than said specified number.

17. A system for vehicle to vehicle communication among a plurality of vehicles having wireless communication links, the system structured with a controller in each participating vehicle, comprising:

not less than one message receiver module, for receiving messages transmitted from other vehicles;

immediate follower management module, for receiving messages forwarded from said not less than one message receiver module and determines the location of a receiving vehicle relative to a sending vehicle;

emergency message generation module, for generating priority messages when an emergency event occurs;

relevancy decision module, for receiving messages from said message receiver module and determining whether said transmitting vehicle is a potential hazard to the receiving vehicle;

leader management module, for receiving messages from said message receiver module and determining whether a vehicle should continue broadcasting said priority message based on its leadership position;

forwarding monitor module, for receiving messages from said message receiver module and determining whether to forward said priority message;

emergency message broadcasting module, for broadcasting not less than one priority message when directed to broadcast said priority message by said leader management module;

forwarding broadcasting module, for broadcasting said forwarded priority message when directed to forward said priority message by said forwarding monitor module;

system clock module for periodically triggering the broadcast of regular driving messages;

regular driving message generation module for generating vehicle motion update information when triggered by said system clock; and regular message broadcasting module for broadcasting said vehicle motion update information received from said regular driving message generation module.

18. The method for vehicle to vehicle communication according to claim 17, wherein said priority message broadcast by said emergency message broadcasting module receives high priority status.

19. The method for vehicle to vehicle communication according to claim 17, wherein said forwarded priority message broadcast by said forwarding message broadcasting module receives mid priority status.

20. The method for vehicle to vehicle communication according to claim 17, wherein said vehicle motion update information broadcast by said regular message broadcasting module receives low priority status.

21. An article of manufacture comprising a computer usable medium having computer readable program code embodied in said medium which, when said program code is executed by said computer causes said computer to perform method steps for vehicle to vehicle communication among a plurality of vehicles having wireless communication links, comprising:

receiving notification of an emergency status from a notifying vehicle, wherein said emergency status includes a sudden change in vehicle behavior;

broadcasting a priority message to surrounding vehicles within a transmission range if said notifying vehicle is in said emergency status;

determining whether said emergency status comprises an emergency event, wherein said emergency event includes creating a potential hazard to other vehicles;

discontinuing broadcasting of said priority message to said surrounding vehicles is said emergency status does not comprise and emergency event;

defining a repeat cycle, wherein said repeat cycle comprises the frequency with which said priority message is re-broadcast;

defining a maximum number of repetitions for said priority message;

pausing between each transmission of said priority message;

determining whether said maximum number of repetitions has been reached;

repeating broadcasting said priority message and pausing between each said transmission until said maximum number of repetitions has been reached; and electing a leader vehicle, wherein said leader vehicle is the primary transmitting vehicle in a series of vehicles reacting to said emergency event.

* * * * *